United States Patent
Ichizawa et al.

(10) Patent No.: US 6,368,397 B1
(45) Date of Patent: Apr. 9, 2002

(54) INK FOR INK JET PRINTING

(75) Inventors: Nobuyuki Ichizawa; Toshitake Yui; Kyoko Horinouchi; Ken Hashimoto, all of Minamiashigara (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/447,417

(22) Filed: Nov. 23, 1999

(30) Foreign Application Priority Data

Jan. 13, 1999 (JP) .......................................... 11-006061

(51) Int. Cl.$^7$ .............................................. C09D 11/00
(52) U.S. Cl. ................................ 106/31.65; 106/31.86; 106/31.9
(58) Field of Search ........................... 106/31.65, 31.86, 106/31.9

(56) References Cited

U.S. PATENT DOCUMENTS

| | | | | |
|---|---|---|---|---|
| 4,959,661 A | * | 9/1990 | Buxton et al. .............. | 106/31.65 |
| 5,085,698 A | | 2/1992 | Ma et. al ....................... | 106/20 |
| 5,172,133 A | | 12/1992 | Suga et al. ................... | 346/1.1 |
| 5,439,514 A | * | 8/1995 | Kashiwazaki et al. ... | 106/31.86 |
| 5,538,548 A | * | 7/1996 | Yamazaki ................. | 106/31.86 |
| 5,928,419 A | * | 7/1999 | Uemura et al. ............. | 106/493 |
| 5,993,524 A | * | 11/1999 | Nagai et al. .............. | 106/31.27 |
| 6,074,467 A | * | 6/2000 | Tabayashi et al. ........ | 106/31.65 |
| 6,080,229 A | * | 6/2000 | Watanabe et al. ........ | 106/31.43 |
| 6,084,619 A | * | 7/2000 | Takemoto et al. ........ | 106/31.72 |
| 6,143,807 A | * | 11/2000 | Lin et al. ..................... | 523/161 |
| 6,153,001 A | * | 11/2000 | Suzuki et al. ............. | 106/31.65 |

FOREIGN PATENT DOCUMENTS

| | | |
|---|---|---|
| JP | 8-193175 | 7/1996 |
| JP | 9-207424 | 8/1997 |

* cited by examiner

*Primary Examiner*—C. Melissa Koslow
*Assistant Examiner*—Veronica F. Faison
(74) *Attorney, Agent, or Firm*—Morgan, Lewis & Bockius LLP

(57) ABSTRACT

An ink for ink jet printing which contains as essential components pigment, water-soluble organic solvent, and water. The ink contains particles, after ink jetting, such that the number-average particle diameter is 10 to 150 nm and the number of particles larger than 0.5 $\mu$m is $6\times10^4$ to $6\times10^5/\mu$l and the number of particles larger than 5 $\mu$m is less than 50/$\mu$l. This ink may be used in combination with a second liquid which contains a water-soluble organic solvent having a solubility parameter of 9 to 11, and/or surfactant, and water. A method of ink jet printing uses the ink or a combination of the ink and the liquid. The ink possesses the characteristics of both optical density and storage stability. The liquid prevents the mixing of colors of adjacent printed images.

17 Claims, No Drawings

INK FOR INK JET PRINTING

BACKGROUND OF THE INVENTION

1. Field of the Invention

The present invention relates to a new ink for ink jet printing, a combination of the ink and a liquid, and a method for ink jet printing with those.

2. Description of the Related Arts

Among many printing methods is the so-called ink jet printing, which causes a liquid ink or a molten solid ink to jet from a nozzle, slit, or porous film, thereby making records on paper, cloth, film, and the like. The printer for ink jet printing has the advantage of being small in size, low in price, and quiet in operation. It is commercially available as a black (monochromatic) printer which achieves high-quality printing on plain paper (such as report paper and copying paper). With the wide diffusion of ink jet printers, attempts have been made to improve ink for ink jet printing.

Ink for ink jet printing should (1) give uniform images with high resolution and high density without color mixing (intercolor bleed), (2) discharge itself accurately and stably without nozzle clogging due to drying, (3) dry rapidly on paper, (4) give images with good fastness, and (5) have good long-term stability. Many attempts have been made to meet these requirements.

Ink for ink jet printing has been dominated by ink of water-based dye. It poses a problem of waterfastness and light fastness arising from the water-soluble dye. It is not necessarily satisfactory in image storage stability. On the other hand, many kinds of ink containing pigment as a colorant have been proposed for improvement on waterfastness and light fastness. Having achieved the purpose and being preference, some of them have been put to practical use. For example, U.S. Pat. No. 5,085,698 discloses an ink containing an AB or BAB block copolymer as a dispersant, and U.S. Pat. No. 5,172,133 discloses an ink containing a specific pigment, water-soluble polymer, and solvent.

A pigment ink is good in waterfastness but is liable to flocculate during storage for a long time or at a high temperature, or it poses a problem of storage stability. Optical density and dispersion stability are mutually contracting properties. A pigment with a high flocculation force flocculates on paper after printing, thereby giving a high optical density; however, it is poor in dispersion stability because of its high flocculation force.

There are several ways of increasing the optical density by (1) increasing the concentration of pigment in ink, (2) using a more hydrophobic dispersant, (3) decreasing the amount of dispersant, and (4) using a pigment with higher oil absorption. The first results in poor storage stability and head clogging due to pigment flocculation. The second to fourth also result in poor storage stability, particularly at a high temperature. Improvement in dispersion stability needs some means contrary to the foregoing. High optical density is still incompatible with good dispersion stability.

Japanese Patent Application Laid-open Nos. 8-193175 and 9-207424 disclose a method of increasing optical density by causing the pigment to react with a treating solution for flocculation immediately after printing with a pigment ink. This method achieves independently the object of increasing optical density and the object of improving dispersion stability. However, this method has the disadvantage of requiring a treating solution in addition to ink. This treating solution increases the total amount of liquid on paper, presenting problems such as longer drying time and paper wrinkling and curling.

SUMMARY OF THE INVENTION

The present invention was completed to solve the above-mentioned problems involved in the prior art technology. The present invention provides an ink for ink jet printing which is of pigment dispersion type and is characterized by both good storage stability and high optical density at time of printing.

The present invention also provides an ink for ink jet printing which invariably produces clear images on plain paper. The present invention also provides a recording material of an ink and a liquid which prevents an ink of pigment dispersion type from mixing with another ink of different color, thereby giving clear images, at the time of ink jet printing on plain paper.

The present invention also provides a method for performing ink jet printing with the ink for ink jet printing.

The inventors of the present invention carried out extensive studies on an ink for ink jet printing of pigment dispersion type which comprising pigment, aqueous polymer, water-soluble organic solvent, and water. It was found that if the ink is to give a high optical density, the ink should be able to produce particles of adequate size on paper and hence the ink should contain particles having a particle diameter larger than 0.5 $\mu$m. Such coarse particles, however, are liable to clog the passage from the ink reservoir to the head and to flocculate and precipitate during long-term storage. It was also found that an ink gives a high optical density at the time of printing if it contains particles such that the number of particles, having a particle diameter larger than 0.5 $\mu$m, is less than $6\times10^4/\mu l$ before ink jetting and the number of particles, having a particle diameter larger than 5 $\mu$m, is less than $50/\mu l$ before ink jetting and the number of particles, having a particle diameter larger than 0.5 $\mu$m, increases to $6\times10^4/\mu l$ to $6\times10^5/\mu l$ after ink jetting. The present invention is based on this finding.

The present invention covers an ink for ink jet printing which contains a pigment, a water-soluble organic solvent, and water. In the ink, the number-average particle diameter is from 10 to 150 nm after ink jetting, the number of particles having a particle diameter larger than 0.5 $\mu$m is $6\times10^4$ to $6\times10^5/\mu l$ after ink jetting, and the number of particles having a particle diameter larger than 5 $\mu$m is less than $50/\mu l$ after ink jetting.

In the ink, the number-average particle diameter may be 10 to 150 nm before ink jetting, the number of particles having a particle diameter larger than 0.5 $\mu$m may be less than $6\times104$ before ink jetting, the rate of change of the number-average particle diameter may be from 0 to 50%, and the number of particles having a particle diameter larger than 0.5 $\mu$m is $6\times10^4/\mu l$ to $6\times10^5/\mu l$ after ink jetting.

In the ink, the number of particles having a particle diameter larger than 0.5 $\mu$m may increase threefold or more after ink jetting.

The ink may contain an aqueous polymer having an HLB of 11 to 15.

In the ink, the aqueous polymer may be a dispersant and the water-soluble organic solvent may have a solubility parameter equal to or larger than 11.

In the ink, the water-soluble organic solvent having a solubility parameter equal to or larger than 11 and smaller than 15 may be less than 5 wt % of the total amount (by weight) of the ink, and the water-soluble organic solvent having a solubility parameter of 15 and above may be 1 to 50 wt % of the total amount (by weight) of the ink.

In the ink, the dispersant may have a weight-average molecular weight of 3000 to 20000.

In the ink, the pigment may be carbon black having a primary aggregate particle diameter of 10 to 30 nm.

The method of ink jet printing according to the present invention uses the above ink for ink jet printing.

The method of ink jet printing may employ the thermal ink jet system.

The recording material according to the present invention contains the above ink and a second liquid containing a water-soluble organic solvent with a solubility parameter of 9 to 11 and/or a surfactant and water.

In the recording material, the ink may have a surface tension of 35 to 55 mN/m and the second liquid may have a surface tension of 20 to 40 mN/m.

In the recording material, the second liquid may contain a multivalent metal salt and/or a cationic compound.

In the recording material, the second liquid may or may not contain a colorant.

The above method of ink jet printing may use the above recording material.

In the method of ink jet printing, the ink and the second liquid may be jetted adjacently for performing printing with the ink and the second liquid adjacently.

In the method of ink jet printing, the recording material may be jetted with the ratio of the second liquid to the ink being 2:10 to 0.1:10.

The above method of ink jet printing may employ a thermal Link jet system.

(Operation)

An ink for ink jet printing should preferably have the property that it contains coarse particles in a small amount immediately after its production and particles flocculate as soon as the ink reaches paper. According to the present invention, it is possible to achieve both good storage stability and high optical density by controlling coarse particles only with mechanical stress induced by jetting, without impairing storage stability.

It has been considered that pigment flocculation is induced largely by the dispersant adsorbed on pigment. The mechanism of flocuulation is not yet fully elucidated. Presumably, flocculation takes place as the result of the solvent or surfactant with a strong affinity for pigment being replaced by the dispersant on the pigment surface. Flocculation also takes place when the dispersant has weak affinity for water or strong affinity for each other so that the dispersant hardly dissolves in water but adsorbs each other.

The first case is a slow process which does not cause flocculation to take place within a short period of storage. In this slow process, the solvent and surfactant perform the function of humectant and control the surface tension. The second case is a comparatively fast process which causes significant flocculation to take place in a short period of storage. For this reason, it is common practice to improve the hydrophilic nature in order to secure the dispersion stability.

In their research into the improvement on the hydrophilic nature, the present inventors found that if ink contains an aqueous polymer with a properly controlled HLB, it permits particles therein to become coarser as soon as it is jetted out.

In other words, an aqueous polymer having an HLB of 11 to 15 undergoes association and increase of viscosity due to stress induced by jetting. This association brings about the flocculation of pigment particles, giving rise to a high optical density. A polymer existing in the form of colloid dose not bring about the coagulation of pigment particles; however, it forms an associated product which fills the interstices between paper fibers, thereby preventing the pigment from infiltrating into paper and giving a high optical density. Moreover, coarse particles prevent two adjacent color inks from mixing together.

With an HLB lower than 11, the aqueous polymer is so hydrophobic that it readily undergoes association while the ink is stored and hence increases in viscosity, giving rise to gel. With an HLB higher than 15, the aqueous polymer is so hydrophilic that it does not undergo association even when the ink is jetted out. Consequently, it does not contribute to increase in optical density and prevention of color mixing (intercolor bleed).

It is considered that the long-term storage stability of the ink is greatly affected by the above-mentioned slow process of the solvent and surfactant. A proper selection of in a solvent having a weak affinity for particles is essential for good storage stability.

DESCRIPTION OF THE PREFERRED EMBODIMENTS

The invention will be described in more detail in the following.

According to the present invention, the ink for ink-jet printing should contain pigment, aqueous polymer, water-soluble organic solvent, and water as a components. It may further contain additives such as surfactant pH adjusting agent, hydrotropic agent, chelating agent, inclusion compound, oxidizing agent, antioxidant, reducing agent, enzyme, germicide, anti-foaming agent, and abrasive, if necessary.

The term "particles" as used in the present invention mean pigment particles or polymer colloid (so-called polymer emulsion) which exist in the ink.

According to the present invention, the ink for ink-jet printing should contain (before jetting) particles such that the number of particles, having a particle diameter larger than 0.5 $\mu$m, is as small as possible, preferably smaller than $6\times10^4/\mu l$, more preferably smaller than $3\times10^4/\mu l$. This is necessary for good storage stability. With a number smaller than $6\times10^4/\mu l$, the ink does not clog the head passage with coarse particles immediately after jetting. The reason is that stress due to jetting builds up at the head end but not in the head passage. More—over, the jetting force applied to the ink prevents the sticking of particles. If the number of particles larger than 0.5 $\mu$m exceeds $6\times10^4/\mu l$, the jetting force cannot prevent the sticking of particles any longer, with the result that the ink discharge becomes impossible. In addition, these coarse particles function as nuclei for flocculation, aggravating storage stability.

According to the present invention, the ink for ink jet printing should contain particles (before jetting) such that the number of particles, having a particle diameter larger than 5 $\mu$m, is smaller than $50/\mu l$. Otherwise, the head will clog up, disabling ink jetting.

According to the present invention, the ink for ink jet printing should contain particles such that the number of particles larger than 0.5 $\mu$m in particle diameter is threefold at the time of ink jetting. Otherwise, the effect of increasing the optical density will be too little to be visibly noticeable. On the other hand, the ink should contain particles such that the number of particles larger than 0.5 $\mu$m in particle diameter increases to $6\times10^4$ to $6\times10^5/\mu l$ when it is jetted out by the ink jet printer. If the upper limit is exceeded, the ink will cause the head clogging, disabling ink jetting.

The fact that the number of coarse particles increases due only to ink jetting depends on the HLB of the aqueous polymer employed. This will be discussed later in more detail.

The ink for ink jet printing should be stable such that the number of particles larger than 0.5 μm in particle diameter increases very little even when it is stored at 60° C. for 100 hours. Storage in such a hot environment is equivalent to long-term storage at normal temperature for 2 years. This is indication for storage stability.

After storage at 60° C. for 100 hours, the ink should contain particles such that the number of particles, having a particle diameter larger than 0.5 μm, is less than $6 \times 10^4/\mu l$. Otherwise, the ink will clog up in the passage, disabling ink jetting.

The fact that the number of coarse particles increases in the initial state depends on the reduction of the number of particles larger than 0.5 μm present in ink of initial state per 1 μl and the solubility parameter of the organic solvent in the ink. The solubility parameter of the organic solvent will be mentioned later.

Measurements of the number of particles larger than 0.5 μm and larger than 5 μm in particle diameter should preferably be carried out by means of "Accusizer" made by Particle Sizing Systems Co., Ltd. in the USA. A sample for measurement is prepared by diluting 2 μl of ink with 50 ml of water.

According to the present invention, the ink for ink jet printing should contain particles such that their number-average particle diameter is in the range of 10 to 150 nm, preferably 10 to 100 nm. With a number-average particle diameter larger than 150 nm, particles in the ink will clog the head passage during storage. The lowest limit has been established because it is necessary to reduce the primary agrregate particle diameter and improve the dispersibility (which is impractical) if particles are to have a number-average particle diameter smaller than 10 nm.

The ink should change, as the result of ink jetting, in the number-average particle diameter by up to 50%. This means that particles flocculate and grow into coarser particles. If the rate of change exceeds 50%, the number of coarse particles in the ink exceeds $60 \times 10^4/\mu l$, with the result that the ink cannot be discharged.

Measurement of particle diameter may be carried out by any known method, such as centrifuge method, laser diffraction (light scattering) method, ESA method, capillary method, and electron microscope method. A preferred method is by microtrack UPA9340 (from Leeds & Northrup Co., Ltd.) which is based on dynamic light scattering. In the present invention, the microtrack UPA9340 was used. The viscosity of the ink as such was regarded as the viscosity of the solvent.

The term "jetting" as used in the present invention implies jetting accomplished by any means, such as heating (which boils and expands the ink, thereby causing ink jetting), piezoelectric vibration, and application of ultrasonic waves. Any apparatus may be used for ink jetting.

According to the present invention, the ink for ink jet printing contains a pigment which is not restricted specifically. It includes the following.

Inorganic pigments, such as zinc white, titanium white, chrome oxide, alumina white, cadmium yellow, zinc sulfide, zinc chromate, chrome yellow, barium sulfate, basic lead sulfate, calcium carbonate, white lead, ultramarine, calcium silicate, manganese violet, cobalt violet, iron blue and carbon black.

Organic pigments, such as madder lake, cochineal lake, naphthol green B, naphthol green Y, naphthol yellow S, permanent red 4R, Hansa yellow, benzidine yellow, Rithol red, lake red C, lake red D, brilliant carmine 6B, bordeaux 10B, phthalocyanine blue, phthalocyanine green, sky blue, Rhodamine lake, methyl violet lake, quinoline yellow lake, peacock blue lake, thioindigomarine, alizarin lake, quinacridone red, Perylene red, aniline black, dioxadine violet, organic fluorescent pigment, and isoindolinone yellow.

Magnetic materials and super paramagnetic materials, such as cobalt oxide, γ-iron oxide, metal powder, barium ferrite, magnetite, and ferrite.

Plastics pigment and metal luster pigment.

An adequate pigment should be selected according to the desired color. It may be used in combination with one or more known dyes.

Those pigments to give full color (4-color) printed images are listed below in terms of trade name and C.I. pigment number.

Black pigments: carbon blacks (such as furnace black, lamp black, acetylene black, and channel black).

Products of Columbian: Raven 7000, Raven 5750, Raven 5250, Raven 5000 ULTRA II, Raven 3500, Raven 2000, Raven 1500, Raven 1250, Raven 1200, Raven 1190 ULTRA II, Raven-170, Raven 1255, and Raven 1080.

Products of Cabot: Regal 400R, Regal 330R, Regal 660R, Mogul L, Black Pearls L, Black Pearls 1300, Monarch 700, Monarch 800, Monarch 880, Monarch 900, Monarch 1000, Monarch 1100, Monarch 1300, and Monarch 1400.

Products of Degussa: Color Black FW1, Color Black FW2, Color Black FW2V, Color Black 18, Color Black FW200, Color Black S150, Color Black S160, Color Black S170, Printex 35, Printex U, PrintexV, Printex140U, Printex140V, SpecialBlack 6, Special Black 5, Special Black 4A, and Special Black 4.

Products of Mitsubishi Chemical: No. 25, No. 33, No. 40, No. 47, No. 52, No. 900, No. 2300, MCF-88, MA600, MA7, MA8, and MA100.

Of these carbon blacks, the one having a primary aggregate particle diameter of 10 to 30 nm is preferable.

Cyanpigments: C.I. Pigment Blue-1, C.I. Pigment Blue-2, C.I. Pigment Blue-3, C.I. Pigment Blue-15:3, C.I. Pigment Blue-15:34, C.I. Pigment Blue-16, C.I. Pigment Blue-22, and C.I. Pigment Blue-60.

Magenta pigments: C.I. Pigment Red 5, C.I. Pigment Red 7, C.I. Pigment Red 12, C.I. Pigment Red 48, C.I. Pigment Red 48:1, C.I. Pigment Red 57, C.I. Pigment Red 112, C.I. Pigment Red 122, C.I. Pigment Red 123, C.I. Pigment Red 146, C.I. Pigment Red 168, C.I. Pigment Red 184, and C.I. Pigment Red 202.

Yellowpigments: C.I. Pigment Yellow-1, C.I. Pigment Yellow-2, C.I. Pigment Yellow-3, C.I. Pigment Yellow-12, C.I. Pigment Yellow-13, C.I. PigmentYellow-14, C.I. PigmentYellow-16, C.I. Pigment Yellow-17, C.I. Pigment Yellow-73, C.I. Pigment Yellow-74, C.I. PigmentYellow-75, C.I. PigmentYellow-83, C.I. Pigment Yellow-93, C.I. Pigment Yellow-95, C.I. Pigment Yellow-97, C.I. Pigment Yellow-98, C.I. Pigment Yellow-114, C.I. PigmentYellow-128, C.I. PigmentYellow-129, C.I. Pigment Yellow-151, and C.I. Pigment Yellow-154.

These pigments may be used alone or in combination with one another. In addition, these pigments may be used in combination with the pigment which has been newly synthesized for the present invention.

The content of the pigment in the ink should preferably be 0.3 to 20 wt %, more preferably 0.5 to 8 wt %.

The pigment may be surface-treated as follows before use.

Treatment with alcohol (such as ethanol and propanol) and surfactant.

Treatment with a pigment derivative which replaces acid groups or basic groups.

Treatment with a substance that covers the pigment surface.

Treatment for surface chemical reaction (condensation reaction and graft reaction) to introduce substituents.

Treatment with a coupling agent, such as silane coupling agent, titanate coupling agent, zirconate coupling agent and aluminate coupling agent.

Plasma treatment and CVD treatment.

A pigment capable of self-dispersion into water may also be used. It may be prepared by any known method (for introduction of hydrophilic functional groups into the surface of the pigment) or by a newly invented method. Such methods include treatment with an oxidizing agent (such as nitric acid, permanganate, dichromate, hypochlorite, ammonium persulfate, hydrogen peroxide, and ozone), treatment with a coupling agent, treatment for polymer grafting, and plasma treatment. Any commercial hydrophilic pigment may be used.

Some examples of the hydrophilicized pigment capable of self-dispersion into water which can be used in the present invention are Microjet Black CW-1 (from Orient Kagaku Kogyo) and Cab-O-Jet 200 and Cab-O-Jet 300 (from Cabot Corp.). The surface-modified pigment contains solubilizing groups which are nonionic, cationic, or anionic. Such groups as sulfonic acid, carboxylic acid, phosphoric acid, and hydroxyl group are preferable. These acids may be in the form of free acid; however, they should preferably be in the form of salt with a basic compound for better water solubility. Compounds to form the salt include alkali metals (such as sodium, potassium, and lithium), aliphatic amines (such as monomethylamine, dimethylamine, and triethylamine), alcohol amines (such as monomethanolamine, monoethanolamine, diethanolamine, triethanolamine, diisopropanolamine), and ammonia. Of these examples, alkali metals are preferable. They are strong electrolytes and effectively promote the dissociation of the acid group.

The pigment may be used after cleaning and purification if necessary. Commercial pigments often contain a large amount of organic or inorganic impurities. Water-insoluble or hardly water-soluble (or water-dispersible) multivalent metal cations and Si-containing and P-containing impurities cause nozzle clogging (which adversely affects storage stability and recording reliability). Cleaning and purification of pigment are necessary for their removal. This object may be achieved by filtration, centrifugal separation, membrane separation, treatment with ion exchange resin, reverse osmosis, activated carbon adsorption, zeolite treatment, water washing, and solvent extraction.

The amount of inorganic impurities in the ink should preferably be less than 500 ppm, more preferably less than 300 ppm, so that nozzle clogging will not occur. Also, the amount of calcium, iron, silicon, and magnesium (which readily cause clogging) should be less than 30 ppm, preferably less than 20 ppm, more preferably less than 10 ppm. (These limitations are not a condition of the present invention.) The concentration of cations in the ink may be determined by atomic absorption spectrometry or inductively coupled plasma atomic fluorescence spectrometry.

According to the present invention, the ink for ink jet printing should contain an aqueous polymer which has an HLB of 11 to 15. With an HLB lower than 11, the aqueous polymer is so hydrophobic that it readily associates during storage. Association leads to an increased viscosity and gelation. With an HLB higher than 15, the aqueous polymer is so hydrophilic that it does not associate during jetting. The result is no increase in optical density.

The HLB of the aqueous polymer may be adjusted as desired by changing the ratio of the hydrophilic portion to the hydrophobic portion or by changing the species of the hydrophilic groups and hydrophobic groups.

There are several methods for measurements and calculations of HLB. Results slightly differ depending on the method used. In the present invention, the method proposed by Davies in 1957 was employed. According to this method, the aqueous polymer is separated into the hydrophilic portion and the hydrophobic portion and the HLB of each portion is calculated from the equation (1) below. Then, a weighted mean of the two values is calculated from the equation (2) below. The thus obtained value is defined as the HLB of the aqueous polymer.

$$HLB_x = 7 + \Sigma(\text{no. of hydrophilic groups}) + \Sigma(\text{no. of hydrophobic groups}) \quad (1)$$

$$HLB_y = \frac{\Sigma(W_x \times HLB_x)}{\Sigma W_x} \quad (2)$$

(where HLB. denotes the HLB of only the hydrophilic portion and the hydrophobic portion, and $W_x$ denotes the respective weight of the hydrophilic portion and the hydrophobic portion.)

According to the present invention, the aqueous polymer in the ink for ink jet printing should preferably contain molecules having hydrophobic groups at both terminals in an amount of 10 to 60% of the total amount of the polymer. Such molecules readily associate through the hydrophobic groups, particularly when they undergo stress due to jetting. With an amount less than 10%, the aqueous polymer does not readily associate (and hence there is no increase in viscosity and optical density) at the time of jetting. With an amount more than 60%, the aqueous polymer readily associates, forming gel, even in the absence of jetting. This interrupts stable storage. The terminal group of the aqueous polymer may be either hydrophilic or hydrophobic depending on the kind of the polymerization initiator used.

The ratio of the hydrophobic groups at both terminals is defined as follows. If the initiator is the hydrophobic group, one terminal group is always a hydrophobic group. The ratio of the hydrophobic groups at the opposite terminal is the ratio of the hydrophobic groups at both terminals which are present in all the polymer. This ratio is calculated from the molar ratio of hydrophilic groups to hydrophobic groups incorporated at the time of polymerization. If the initiator is the hydrophilic group, one terminal group is always a hydrophilic group. As a result, both of the terminal group are not hydropholic group. Consequently, it is possible to change the ratio of hydrophobic groups at terminals by adjusting the ratio of hydrophilic groups to hydrophobic groups at the time of polymerization by using an initiator with hydrophilic groups.

In the present invention, the aqueous polymer used in the ink for ink jet printing implies aqueous polymer colloid (polymer emulsion) and water-soluble polymer.

Examples of polymer colloid include acrylic polymer emulsion, vinyl acetate polymer emulsion, urethane polymer emulsion, acrylic-styrene polymer emulsion, butadiene polymer emulsion, styrene polymer emulsion, polyester polymer emulsion, silicone polymer emulsion, fluorohydrocarbon polymer emulsion, and acrylic-silicone polymer emulsion.

Examples of the water-soluble polymers are listed below.
(1) Homopolymer (or salt thereof) of hydrophilic monomer composed of a hydrophobic moiety connected to the surface of the pigment particles and a hydrophilic moiety having a $SO_3H$ group.
(2) Copolymer (or salt thereof) formed from hydrophobic monomer and hydrophilic monomer having a $SO_3H$ group.
(3) Polymer (or salt thereof) obtained by sulfonation (to make hydrophilic) of a homopolymer of hydrophobic monomer or a copolymer composed of more than one hydrophobic monomer.
(4) Homopolymer (or salt thereof) of hydrophilic monomer composed of a hydrophobic moiety and a hydrophilic moiety having a $H_3PO_4$ group.
(5) Copolymer (or salt thereof) composed of hydrophobic monomer and hydrophilic monomer having a $H_3PO_4$ group.
(6) Homopolymer (or salt of thereof) of hydrophilic monomer composed of a hydrophobic moiety and a hydrophilic moiety having a COOH group.
(7) Copolymer (or salt thereof) composed of hydrophobic monomer and hydrophilic monomer having a COOH group.

These polymers may be copolymerized with other components if necessary. These polymers may be used alone or in combination with one another.

These copolymers may be random copolymer, graft copolymer, or block copolymer. Their salts may be formed from alkali metal, alcohol amine (such as monoethanolamine, diethanolamine, and triethanolamine), and onium compound (such as ammonium ion, sulfonium ion, oxonium ion, stibonium ion, stannonium ion, and iodonium ion).

Examples of the hydrophilic monomer having a $SO_3H$ group include styrenesulfonic acid and derivatives thereof, naphtha-lenesulfonic acid and derivatives thereof, vinylsulfonic acid and derivatives thereof, benzenesulfonic acid and derivatives thereof, and toluenesulfonic acid and derivatives thereof. Of these examples, the first three are preferable.

Examples of the hydrophilic monomer having a $H_3PO_4$ group include higher alkyl phosphate ester salt and phosphate ester salt of higher alcohol ethylene oxide adduct.

Examples of the hydrophilic monomer having a COOH group include α,β-ethylenic unsaturated carboxylic acid and aliphatic alcohol ester thereof, acrylic acid and derivatives thereof, meth-acrylic acid and derivatives thereof, maleic acid and derivatives thereof, itaconic acid and derivatives thereof, and fumaric acid and derivatives thereof, of these examples, acrylic acid and meth-acrylic acid and derivatives thereof are preferable.

Examples of the hydrophobic monomer include styrene and derivatives thereof, vinyltoluene and derivatives thereof, vinyl-naphthalene and derivatives thereof, butadiene and derivatives thereof, isoprene and derivatives thereof, ethylene and derivatives thereof, propylene and derivatives thereof, alkyl acrylate, and alkyl methacrylate. Of these examples, styrene and derivatives thereof, alkyl acrylate, and alkyl methacrylate are preferable, with alkyl group having 1–10 carbons, preferably 1–6 carbons.

Examples of other components include acrylamide and derivatives thereof, dimethylaminoethyl methacrylate, ethoxyethyl methacrylate, butoxyethyl methacrylate, ethoxytriethylene methacrylate, vinylpyrrolidone, vinylpyridine, alkyl ether, polyoxyethylene-containing components (such as methoxypolyethylene glycol methacrylate and polyethylene glycol methacrylate), and hydroxyl group-containing components (such as hydroxymethyl methacrylate, hydroxyethyl methacrylate, and vinyl alcohol).

Moreover, the aqueous polymer may be produced by addition polymerization of hydrophilic monomer to hydrophobic monomer which is a condensation polymer (polyester) formed from an unsaturated carboxylic acid and alcohol or glycol. Other examples of the aqueous polymer include polyvinyl alcohol modified with carboxylic acid and carboxymethyl cellulose. They are not limitative.

The amount of the monomer having a COOH group (or salt thereof), a $SO_3H$ group (or salt thereof), or a $H_3PO_4$ group (or salt thereof) should be 0.1 to 100 mol %, preferably 30 to 100 mol %, among the polymer. The polymer containing COOH groups (or salt thereof) should have an acid value of 100 to 800, preferably 150 to 800. The polymer containing $SO_3H$ groups (or salt thereof) or $H_3PO_4$ group (or salt thereof) should have an acid value of 100 to 500. The polymer containing COOH groups (or salt thereof) should have an acid value of 100 to 500.

The aqueous polymer should preferably have a weight-average molecular weight of 3000 to 20000 so that the ink has an adequate viscosity. The weight-average molecular weight maybedeterminedbyanyof lightscatteringmethod, X-raysmall angle scattering method, sedimentation equilibrium method, diffusion method, ultra centrifugal method, and chromatography. It is possible to use the value in terms of polyethylene glycol measured by GPC method.

The content of the aqueous polymer in the ink for ink jet printing should be in the range of 0.002 to 10 wt %, preferably 0.003 to 8 wt %. with a content less than 0.002 wt %, the aqueous polymer does not produce its effect. With a content more than 10 wt %, the aqueous polymer leads to an increased ink viscosity and a remarkably decreased optical density due to permeation.

The above-mentioned aqueous polymers may be used alone or in combination with one another. They may be used as a dispersing agent for the pigment. In this case, they produce their best effect.

In the case where the aqueous polymer is used as a dispersant, the ratio of the pigment to the aqueous polymer is approximately 10:8 to 10:0.5 (by weight), depending on the particle diameter, specific surface area, and surface structure of the pigment.

Dispersion may be accomplished with the aid of any commercial dispersing machine, such as colloid mill, flow jet mill, slasher mill, high-speed disperser, ball mill, attritor, sand mill, sand grinder, ultrafine mill, Eiger motor mill, Dainoh mill, pearl mill, agitator mill, cobol mill, 3-roll mill, 2-roll mill, extruder, kneader, microfluidizer, laboratory homogenizer, and ultrasonic homogenizer. They may be used alone or in combination with one another. Dispersion should preferably be carried out in the absence of dispersing medium in order to avoid the entrance of inorganic impurities. A microfluidizer or ultrasonic homogenizer is suitable for this end. For thorough dispersion, it is desirable to perform deaeration or defoaming on the aqueous solution to be used for dispersion. A pH value lower than 9 is preferable at the time of dispersion.

According to the present invention, the ink for ink jet printing should contain a water-soluble organic solvent which prevents the ink from solidifying. Examples of the water-soluble organic solvent include polyhydric alcohols and derivatives thereof (such as alkyl ethers), such as glycerin, polyethylene glycol, polypropylene glycol, diethylene glycol, 2-(2-but-oxy)ethanol, diethylene glycol phenyl ether, propylene glycol, propylene glycol monomethyl ether, butylene glycol, triethylene glycol, thiodiglycol, hexylene glycol, ethylene glycol methyl ether, diethylene glycol methyl ether, pentane diol, hexane triol, and trimethylolpropane. They may be used alone or in combination with one another.

Other examples of the water-soluble organic solvent include alcohols (such as methyl alcohol, ethyl alcohol, n-propyl alcohol, isopropyl alcohol, n-butyl alcohol, hexyl alcohol, and benzyl alcohol), amides (such as dimethylformamide and dimethylacetamide), ketones (such as actone), keto alcohols (such as diacetone alcohol), high-boiling nitrogen-containing solvents (such as triethanolamine, diethanolamine, pyrrolidone, N-methyl-2-pyrrolidone, and 1,3-dimethyl-2-imidazolidinone), sulfur-containing solvents (such as dimethylsulfoxide, diethylsulfoxide, sulfolane, and thiodiethanol), sugars and derivative thereof (such as glucose, maltose, amylose (dextrin), cellulose, and sodium alginate), and gum arabic.

These water-soluble organic solvents may be used alone or in combination with one a another. For good long-term dispersion stability, the ink should not contain a water-soluble organic solvent having a solubility parameter lower than 11. The content in the ink of a water-soluble organic solvent having a solubility parameter of 11 to 15 should preferably be less than 5 wt %. Also, the content in the ink of a water-soluble organic solvent having a solubility parameter higher than 15 should preferably be 1 to 50 wt %.

A water-soluble organic solvent having a solubility parameter lower than 11 greatly impairs long-term storage stability due to adsorption to the pigment surface. A water-soluble organic solvent having a solubility parameter of 11 to 15 also deteriorates long-term storage stability due to adsorption to the pigment surface if its content exceeds 5 wt % of the total amount of the ink. A water-soluble organic solvent having a solubility parameter higher than 15 does not function as a humectant if its content is less than 1 wt % of the total amount of the ink. A water-soluble organic solvent having a solubility parameter higher than 15 increases the ink viscosity to such an extent as to disable jetting if its content exceeds 50 wt % of the total amount of the ink.

The solubility parameter may be calculated from evaporation heat, refractive index, kauri butanol value, surface tension, or chemical composition. In the present invention, the solubility parameter ($\delta$) was calculated from Fedors equation below:

$$\delta = (\Sigma \Delta ei / \Sigma \Delta vi)^{1/2}$$

where $\Delta ei$ stands for the evaporation energy of atoms or atomic groups and $\Delta vi$ stands for the molar volume.

According to the present invention, the ink for ink jet printing contains water. It is desirable to use deionized water, ultra pure water, distilled water, or ultra filtered water so as to avoid the entrance of impurities.

According to the present invention, the ink for ink jet printing may contain any known surfactant so as to control the jetting stability and the drying time (or permeation) at the time of printing, through adjustment of surface tension. The surfactant may be nonionic, anionic, cationic, or amphoteric. A nonionic surfactant is preferable because it keeps conductivity low.

Examples of the nonionic surfactant include polyoxyethylene nonyl phenyl ether, polyoxyethylene octyl phenyl ether, polyoxyethylene dodecyl phenyl ether, polyoxyethylene alkyl ether, polyoxyethylene fatty acid ester, sorbitan fatty acid ester, polyoxyethylene/polyoxypropylene block copolymer, polyoxyethylene sorbitan fatty acid ester, fatty acid alkylol amide, and acetylene glycol derivative (Surfinol).

Examples of the anionic surfactant include alkylbenzenesulfonate, alkylnaphthalenesulfonate, formalin condensate of alkylnaphthalenesulfonate, salt of higher fatty acid, sulfate ester salt of higher fatty acid ester, sulfonate of higher fatty acid ester, sulfate ester salt and sulfonate of higher alcohol ether, alkylcarboxylate of higher alkylsulfonamide, sulfosuccinate and salt thereof, alkyl phosphite, alkyl phosphate, salt and ester of alkyl phosphonic acid, and phosphate ester of higher alcohol.

Examples of the cationic surfactant include primary, secondary, and tertiary amine salts, and quaternary ammonium salts.

Examples of the amphoteric surfactant include betaine, sulfobetaine, and sulfate betaine.

Examples of other surfactants include silicone surfactant (polysiloxane-polyoxyethylene adduct), fluorine surfactant (such as perfluoroalkylcarboxylic acid, perfluoroalkylsulfonic acid, and oxyethylene perfluoroalkyl ether), and natural or biosurfactants (such as lecithin, spiclisporic acid, rhamnolipid, saponin, and cholate).

These surfactants may be used alone or in combination with one another. The content of the surfactant should be 0.001 to 7 wt %, preferably 0.001 to 5 wt %, of the total amount of the ink. With an amount less than 0.001 wt %, it does not produce its effect. With an amount more than 7 wt %, it impairs the image quality due to excessively high permeation.

The ink may be incorporated with a hydrotropic agent (as an additive), which includes carboxylates (such as sodium butyrate and sodium salicylate), aromatic sulfonates (such as sodium toluenesulfonate), lower alcohol (such as ethyl alcohol), urea, and acetamide.

Moreover, the ink may be incorporated with a chelating agent, such as ethylenediaminetetraacetic acid (EDTA), iminodiacetic acid (IDA), ethylenediamine-di(o-hydroxyphenylacetic acid) (EDDHA), nitrilotriacetic acid (NTA), dihydroxyethylglycine (DHEG), trans-1,2-cyclohexanediaminetetraacetic acid (CyDTA), dethylenetriamine-N,N,N',N'',N''-pentaacetic acid (DTPA), and glycoletherdiamine-N,N,N',N'-tetraacetic acid (GEDTA).

In addition, the ink may be incorporated with an inclusion compound, such as urea, thiourea, desoxycholic acid, bis-(N,N'-tetramethylenebenzidine), cyclophane, and cyclodextrin. Of these compounds, urea and cyclodextrin are preferable.

The ink should have its pH adjusted properly if necessary. An adequate pH value is 7 to 10. With a pH value higher than 10, the ink produces adverse effects such as corrosion and dissolution of the head material.

The pH adjustment may be achieved with any of alkali (such as sodium hydroxide, potassium hydroxide, lithium hydroxide, sodium sulfate, acetate, lactate, benzoate, triethanolamine, ammonia, 2-amino-2-methyl-1-propanol (AMP), ammonium phosphate, sodium phosphate, and lithium phosphate), and inorganic and organic acids (such as acetic acid, hydrochloric acid, nitric acid, sulfuric acid, phosphoric acid, propionic acid, and p-toluenesulfonic acid). Common pH buffers and good buffers may also be used.

Other additives to be used according to need include oxidizing agent, antioxidant, reducing agent, enzyme, germicide, antifoaming agent, and abrasive.

According to the present invention, the ink for ink jet printing should have a surface tension of 35 to 55 mN/m at 20° C. With a surface tension lower than 35 mN/m, the ink suffers unstable jetting and remarkable color mixing (intercolor bleed). With a surface tension higher than 55 mN/m the ink is poor in permeation into paper and takes a long time for drying.

According to the present invention, the ink for ink jet printing should have a viscosity of 1 to 8 mPa·s, preferably 2 to 4 mPa·s at 20° C. With a viscosity higher than 8 mPa·s, the ink is unstable in discharging. With a viscosity lower than 1 mPa·s, the ink is poor in storage stability.

According to the present invention, the ink for ink jet printing should have a conductivity lower than 0.5 S/m, preferably 0.005 to 0.4 S/m, so that it has good dispersion stability. In the case of light-color ink prepared by dilution, the ink conductivity may be low, preferably 0.005 to 0.2 S/m.

The ink for ink jet printing as defined in the present invention will give printed images of good quality when it is used for printing by any ink jet apparatus, no matter what the principle of operation. The ink may be used for the thermal type apparatus which heats the printing paper at 50 to 200° C., before or after printing, so as to fix the ink rapidly. The ink may also be used for direct printing on plain paper, glossy paper, special paper, cloth, film, and OHP film. It may also be used for indirect printing, in which printing is made first on an intermediate drum or belt and then the image on it is transferred to paper, cloth, or film.

[Combination of ink and liquid]

The above-mentioned ink for ink-jet printing as defined in the present invention may be used the recording material containing a second liquid or may b e used in the form a combination of in ink and a liquid. The combination of an ink and an liquid as defined in the present invention prevents the color mixing (intercolor bleed) of pigment inks and hence gives clear images on plain paper.

The above-mentioned ink for ink jet printing will be referred to as "the first ink" hereinafter when it is used as the ink in "a combination of an ink and a liquid".

The first ink is combined with a second liquid which contains as essential components a water-soluble organic solvent (having a solubility parameter of 9–11) and/or a surfactant and water. The second liquid may also contain a multivalent metal salt and/or cationic compound for improvement in the prevention of color mixing (intercolor bleed).

The second liquid may additionally be incorporated with a water-soluble organic solvent having a solubility parameter higher than 11, colorant, pH adjusting agent, polymer, hydrotropic agent, chelating agent, inclusion compound, oxidizing agent, antioxidant, reducing agent, enzyme, germicide, antifoaming agent, and abrasive, if necessary. If it contains any colorant, it may be used substantially as an ink.

The second liquid contains a water-soluble organic solvent (having a solubility parameter of 9–11) and/or a surfactant and water. Their content should preferably be 1 to 10 wt % of the total amount of the second liquid. An ink of pigment dispersion type has the dispersant on the pigment surface replaced by the solvent and/or surfactant when it comes into contact with a solvent having a low solubility parameter or a surfactant. This interrupts the stability of dispersion. However, this phenomenon takes a long time, and hence it usually has no function to prevent color mixing (intercolor bleed). In the present invention, the first ink flocculates or associates as it is jetted out; therefore, its contact with the liquid promotes flocculation and association in a short time, thereby producing the effect of preventing the color mixing (intercolor bleed).

Incidentally, in the case where the second liquid is incorporated with a pigment, the pigment should be highly compatible with a solvent having a low solubility parameter and a surfactant. A preferred colorant is a dye ink.

The second liquid should preferably contain a multivalent metal salt and/or a cationic compound. Usually, a multivalent metal salt or a cationic compound added to an ink causes the colorant to separate out. (This is true even though the colorant is a dye so long as the colorant is anionic.) Any attempt to produce the effect of preventing the color mixing (intercolor bleed) ends up with the problem of dye separation. However, this incompatibility is eliminated because the first ink flocculates or associates as the result of jetting and a small amount of electrolyte fully produces its effect. These additives may be added in any amount so long as they do not impair reliability.

The water-soluble organic solvent used for the second liquid prevents the ink from solidifying. It is selected from polyhydric alcohols and alkyl ethers and derivatives thereof, whose examples are listed below. Glycerin, polyethylene glycol, polypropylene glycol, diethylene glycol, 2-(2-butoxy) ethanol, diethylene glycol phenyl ether, propylene glycol, propylene glycol monomethyl ether, butylene glycol, triethylene glycol, thiodiglycol, hexylene glycol, ethylene glycol methyl ether, diethylene glycol methyl ether, pentane diol, hexane triol, and trimethylolpropane.

Other components include alcohols (such as methyl alcohol, ethyl alcohol, n-propyl alcohol, isopropyl alcohol, n-butyl alcohol, hexyl alcohol, and benzyl alcohol), amides (such as dimethylformamide and dimethylacetamide), ketones (such as acetone), keto alcohols (such as diacetone alcohol), high-boiling nitrogen-containing solvents (such as triethanolamine, diethanolamine, pyrrolidone, N-methyl-2-pyrrolidone, and 1,3-dimethyl-2-imidazolidinone), sulfur-containing solvents (such as dimethylsulfoxide, diethylsulfoxide, sulfolane, and thiodiethanol), sugars and derivative thereof (such as glucose, maltose, amylose (dextrin), cellulose, and sodium alginate), and gum arabic.

In the second liquid of the present invention, the water-soluble organic solvents may be used alone or in combination with one another. The content of the water-soluble organic solvent should preferably be 1 to 50 wt % of the total amount of the second liquid. With an amount less than 1 wt %, it does not function as a humectant. With an amount more than 50 wt %, it raises the ink viscosity, disabling jetting. The content of the water-soluble organic solvent having a solubility parameter of 9 to 11 should be 1 to 10 wt % of the total amount of the liquid. With an amount less than 1 wt %, it does not produce the effect of promoting flocculation. With an amount more than 10 wt %, it permeates into paper rapidly, resulting in curling. If the liquid contains a colorant, it will infiltrate to the reverse of paper, resulting in a decreased optical density and strike through.

The surfactant to be used for the second liquid may be nonionic, anionic, cationic, or amphoteric. A nonionic or cationic surfactant is preferable because the second liquid often contains a cationic compound. If the second liquid contains an anionic colorant, a nonionic surfactant is preferable for the prevention of separation.

The cationic compound that can be contained in the second liquid include cationic dyes, cationic aqueous polymers, primary, secondary, and tertiary amine salts, and quaternary ammonium compounds, which are exemplified below.

Examples of the cationic aqueous polymer include a copolymer (or a salt thereof) of hydrophilic monomer (having an amino group or quaternary amino group) and hydrophobic monomer. This copolymer may be further copolymerized with other components if necessary. The copolymer may be random copolymer, graft copolymer, or block copolymer.

Examples of the hydrophilic monomer having an amino group and quaternary amino group include those compounds obtained by quaternization of N,N-dimethyl-aminoethylmethacrylamide, N,N-dimethylaminoethyl-acrylamide, N,N-dimethylacrylamide, N,N-dimethylmethacrylamide, or N,N-dimethylamionopropyl-methacrylamide. Quaternization may be accomplished with the aid of methyl chloride, methyl iodide, dimethyl sulfate, benzyl chloride, epichlorohydrin, etc.

Examples of the hydrophobic monomer include styrene and derivatives thereof, vinyltoluene and derivatives thereof, vinylnaphthalene and derivatives thereof, butadiene and derivatives thereof, isoprene and derivatives thereof, ethylene and derivatives thereof, propylene and derivatives thereof, alkyl acrylate, and alkyl methacrylate. Of these examples, styrene and derivatives thereof, alkyl acrylate, and alkyl methacrylate are preferable, with alkyl group having 1–10 carbons, preferably 1–6 carbons.

Examples of other components include acrylamide and derivatives thereof, dimethylaminoethyl methacrylate, ethoxyethyl methacrylate, butoxyethyl methacrylate, ethoxytriethylene methacrylate, vinylpyrrolidone, vinylpyridine, alkyl ether, polyoxyethylene-containing components (such as methoxypolyethylene glycol methacrylate and polyethylene glycol methacrylate), and hydroxyl group-containing components (such as hydroxymethyl methacrylate, hydroxyethyl methacrylate, and vinyl alcohol).

The cationic aqueous polymer should have a weight-average molecular weight of 1000 to 20000, preferably 1000 to 5000, so that the liquid has an adequate viscosity. The weight-average molecular weight may be determined by any of light scattering method, X-ray small angle scattering method, sedimentation equilibrium method, diffusion method, ultra centrifugal method, and chromatography. It is possible to use the value in terms of polyethylene glycol measured by GPC method.

The content of the cationic aqueous polymer in the second liquid should preferably be in the range of 0.002 to 10 wt %. With a content less than 0.002 wt %, the cationic aqueous polymer does not produce its effect. With a content more than 10 wt %, the cationic aqueous polymer leads to an increased liquid viscosity and a remarkably decreased optical density due to permeation.

In the case where the second liquid contains an anionic colorant, the content of the cationic aqueous polymer should be 0.002 to 3 wt %, preferably 0.003 to 1 wt %, of the total amount of the liquid, so as to prevent the separation of the colorant. With a content less than 0.002 wt %, the cationic aqueous polymer does not produce its effect. With a content more than 3 wt %, the cationic aqueous polymer causes the colorant to coagulate and separate.

Incidentally, the cationic aqueous polymer may also be used as the dispersant for the pigment.

Examples of the primary, secondary, and tertiary amine salts, and the quaternary ammonium compounds are:

dodecyltrimethylammonium chloride, dodecylbenzyltri-methyl chloride, dodecyldimethylbenzylammonium chloride, stearyltrimethylammonium chloride, benzyltributylammonium chloride, benzalconium chloride, and cetyltrimethylammonium chloride;

ethylene oxide adduct of higher alkylamine (such as dihydroxy-ethyl-stearylamine);

pyridium salt type compounds (such as cetyl pyridium chloride and cetyl pyridium bromide); and imidazolin type cationic compounds (such as 2-hepatdenicel-hydroxy-ethylimiazolin).

The above-mentioned compounds may be substituted by the so-called cationic surfactant. The amount of these compounds should preferably be 0.002 to 7 wt % of the total amount of the second liquid. With an amount less than 0.002 wt %, they do not produce their effect. With an amount more than 7 wt %, they have an adverse effect on jetting reliability.

In the case where the second liquid contains an anionic colorant, the content of the above-mentioned compound should be 0.002 to 3 wt %, preferably 0.003 to 1 wt %, of the total amount of the liquid. With a content less than 0.002 wt %, it does not produce its effect. With a content more than 3 wt %, it causes the colorant to coagulate and separate.

The second liquid may contain a multivalent metal salt, such as $Ca(NO_3)_2$, $CaCl_2$, $Ca(CH_3COO)_2$, $Al(NO_3)_3$, $Nd(NO_3)_3$, $Y(NO_3)_3$, $Cu(NO_3)_2$, $Zn(NO_3)_2$, $CuCl_2$, $ZnCl_2$, $COCl_2$, $Co(NO_3)_2$, $NiCl_2$, $MgBr_2$, $Mg(NO_3)_2$, $ZnBr_2$, $NH_4Cl$, and $Ni(NO_3)_2$. The amount of the multivalent metal salt should preferably be 0.01 to 10 wt % of the total amount of the second liquid. An amount less than 0.01 wt % is too small to produce the desired effect. An amount more than 10 wt % leads to excessive clogging.

In the case where the second liquid contains an anionic colorant, the content of the multivalent metal salt should be 0.01 to 3 wt %, preferably 0.01 to 1 wt %, of the total amount of the liquid. With a content less than 0.01 wt %, it does not produce its effect. With a content more than 3 wt %, it causes the colorant to coagulate and separate.

The second liquid contains water. It is desirable to use deionized water, ultra pure water, distilled water, or ultra filtered water so as to avoid the entrance of impurities.

The second liquid may optionally contain a colorant selected from the pigments and aqueous dyes explained above in connection with the ink for ink jet printing. Aqueous dyes are preferable. Examples of aqueous dyes are direct dyes and acid dyes listed below.

C.I. Direct Black-2, -4, -9, -11, -17, -19, -22, -32, -80, -151, -154, -168, -171, -194;

C.I. Direct Blue-1, -2, -6, -8, -22, -34, -70, -71, -76, -78, -86, -112, -142, -165, -199, -200, -201, -202, -203, -207, -218, -236, -287;

C.I. Direct Red-1, -2, -4, -8, -9, -11, -13, -15, -20, -28, -31, -33, -37, -39, -51, -59, -62, -63, -73, -75, -80, -81, -83, -87, -90, -94, -95, -99, -101, -110, -189;

C.I. Direct Yellow-1, -2, -4, -8, -11, -12, -26, -27, -28, -33, -34, -41, -44, -48, -58, -86, -87, -88, -135, -142, -144;

C.I. Food Black-i, -2;

C.I. Acid Black-l, -2, -7, -16, -24, -26, -28, -31, -48, -52, -63, -107, -112, -118, -119, -121, -156, -172, -194, -208;

C.I. Acid Blue-1, -7, -9, -15, -22, -23, -27, -29, -40, -43, -55, -59, -62, -78, -80, -81, -83, -90, -102, -104, -111, -185, -249, -254;

C.I. Acid Red-i, -4, -8, -13, -14, -15, -18, -21, -26, -35, -37, -110, -144, -180, -249, -257;

C.I. Acid Yellow-i, -3, -4, -7, -11, -12, -13, -14, -18, -19, -23, -25, -34, -38, -41, -42, -44, -53, -55, -61, -71, -76, -78, -79, -122.

Examples of cationic dyes are listed below.

C.I. Basic Yellow-1, -11, -13, -19, -25, -33, -36;

C.I. Basic Red-1, -2, -9, -12, -13, -38, -39, -92;
C.I. Basic Blue-1, -3, -5, -9, -19, -24, -25, -26, -28.

The content of the dye should be about 0.3~15 wt %, preferably about 1 to 10 wt %, of the total amount of the second liquid. These dyes may be used alone or in combination with one another so as to form custom colors, such as red, blue, and green, in addition to the four primary colors (cyan, magenta, yellow, and black).

EXAMPLES

The invention will be described in more detail with reference to the following examples.

Preparation of Dispersions

TABLE 1

| Dispersions | Pigment | Polymeric dispersant (aqueous polymer) | Calculated HLB | Dispersing method |
|---|---|---|---|---|
| 1 | Carbon black (Raven 5750, from Columbia) | Styrene/sodium methacrylate copolymer (monomer ratio = 50:50, M.W. = 10000) | 14.1 | Microfluidizer (10000 psi, 30 path) |
| 2 | Fastogen Super Magenta RE-03 (from Dainippon Ink and Chemicals, Inc) | Styrene/sodium methacrylate copolymer (monomer ratio = 50:50, M.W. = 10000) | 14.1 | Dainoh mill (zirconia medium 0.5 mm, 1 hour) |
| 3 | Carbon black (Regal 330, from Cabot) | n-butyl methacrylate/sodium methacrylate copolymer (monomer ratio = 50/50, M.W. = 7500) | 13.5 | Attritor (SUS medium 3 mm, 2 hours) |
| 4 | Carbon black (BP880, from Cabot) | 2-ethylhexyl methacrylate/sodium methacrylate copolymer (monomer ratio = 50/50, M.W. = 5400) | 11.7 | Ultrasonic homogenizer (300 W/400 10 mA, 30 min) |
| 5 | Carbon black (Raven 5750, from Columbia) | Styrene/sodium methacrylate copolymer (monomer ratio = 33:67, M.W. = 7300) | 17.8 | Microfluidizer (10000 psi, 30 path) |
| 6 | Carbon black (BP880, from Cabot) | 2-ethylhexyl methacrylate/sodium methacrylate copolymer (monomer ratio = 33/67, M.W. = 5500) | 15.2 | Ultrasonic homogenizer (300 W/400 10 mA, 30 min) |
| 7 | Carbon black (BP880, from Cabot) | 2-ethylhexyl methacrylate/sodium methacrylate copolymer (monomer ratio = 55/45, M.W. = 6000) | 10.8 | Ultrasonic homogenizer (300 W/400 10 mA, 30 min) |
| 8 | Fastogen Super Magenta RE-03 (from Dainippon Ink and Chemicals, Inc) | Styrene/sodium styrenesulfonate copolymer (degree of sulfonation = 95%, monomer ratio = 5/95, M.W. 10000) | 40.9 | Dainoh mill (zirconia medium 0.5 mm, 1 hour) |
| 9 | Carbon black (Raven 5750, from Columbia) | Styrene/sodium acrylate copolymer (monomer ratio = 75:25, M.W. = 3000) | 8.3 | Microfluidizer (10000 psi, 30 path) |

The first ink should contain an aqueous polymer having an HLB of 11 to 15. This aqueous polymer increases the number of coarse particles when the ink is jetted out. With an HLB lower than 11, the aqueous polymer is so hydrophobic that it associates, increasing viscosity and forming gel, during storage. With an HLB higher than 15, the aqueous polymer is so hydrophilic that it does not associate, and hence does not produce the effect of preventing color mixing (intercolor bleed), when the ink is jetted out.

If the second liquid contains a colorant, it can be used substantially as an ink. It prevents color mixing (intercolor bleed) when it is printed adjacent to the first ink.

If the second liquid contains no colorant, it can be used independently of the first ink. It may be jetted out toward the printing part of the first ink before and/or after the first printing. The ratio of the first ink to the second liquid should be 10:2 to 10:0.1, preferably 10:2 to 10:0.5. The drop amount of the first ink should be constant (because it is related with the optical density). If the ratio exceeds 10:2, there will be an excess amount of liquid on the paper, which causes curling and wrinkling and impairs print quality and poses a problem of slow drying. If the ratio is lower than 10:0.1, the second liquid does not produce the effect of preventing color mixing (intercolor bleed).

To use the ink and the liquid in combination, any ink jet printing system may be employ. Thermal ink jet system is preferable.

[Preparation of dispersions 1, 5, and 9]

The dispersant shown in Table 1 (in the form of aqueous solution containing 10% polymer solids) is mixed with deionized water in a ratio of 60 pbw to 210 pbw. To the resulting solution is added 30 pbw of the pigment shown in Table 1. After stirring for 30 minutes, the resulting mixture is subjected to dispersion by a microfluidizer (10000 psi, 30 path). The resulting dispersion is adjusted to pH 9 with 1N-NaOH aqueous solution. The dispersion undergoes ultra centrifuge (8000 rpm, 15 min) and filtration through a 1 μm membrane filter. Thus there are obtained the desired dispersions.

[Preparation of dispersions 2 and 8]

The dispersant shown in Table 1 (in the form of aqueous solution containing 10% polymer solids) is mixed with deionized water in a ratio of 60 pbw to 210 pbw. To the resulting solution is added 30 pbw of the pigment shown in Table 1. After stirring for 30 minutes, the resulting mixture is subjected to dispersion by a Dainoh mill (medium: zirconia 0.5 mm) for 1 hour. The resulting dispersion is adjusted to pH 9 with 1N-NaOH aqueous solution. The dispersion undergoes ultra centrifuge (8000 rpm, 15 min) and filtration through a 1 μm membrane filter. Thus there are obtained the desired dispersions.

[Preparation of dispersion 3]

The dispersant shown in Table 1 (in the form of aqueous solution containing 10% polymer solids) is mixed with deionized water in a ratio of 30 pbw to 240 pbw. To the resulting solution is added 30 pbw of the pigment shown in Table 1. After stirring for 30 minutes, the resulting mixture is subjected to dispersion by an attritor (medium: SUS 3 mm) for 2 hours. The resulting dispersion undergoes ultra centrifuge (8000rpm, 15min) and filtration through a 1 $\mu$m membrane filter. Thus there is obtained the desired dispersion.

[Preparation of dispersions 4, 6, and 7]

The dispersant shown in Table 1 (in the form of aqueous solution containing 10% polymer solids) is mixed with deionized water in a ratio of 60 pbw to 210 pbw. To the resulting solution is added 30 pbw of the pigment shown in Table 1. After stirring for 30 minutes, the resulting mixture is subjected to dispersion by an ultrasonic homogenizer (300W, 400 $\mu$A) for 30 minutes. The resulting dispersion undergoes ultra centrifuge (8000 rpm, 15 min) and filtration through a 1 $\mu$m membrane filter. Thus there are obtained the desired dispersions.

Examples 1 to 4 and Comparative Examples 1 to 5

Each of the dispersions 1 to 9 is gradually added with stirring to the mixture of the following solvent components which have been stirred for 30 minutes. The resulting mixture is stirred further for 30 minutes. Thus there are obtained ink samples. In Examples 1 to 4, the dispersions 1 to 4 are used. In Comparative Examples 1 to 5, the dispersions 5 to 9 are used.

Dispersion 50 pbw
Ethylene glycol (solubility parameter 17.8) 12 pbw
Isopropyl alcohol (solubility parameter 11.6) 3 pbw
Surfinol 465 (from Nisshin Kagaku) 0.05 pbw
Deionized water 35 pbw Test Example 1

Printing (2-cm wide belt) is made with each of the ink samples obtained in Examples 1 to 4 and Comparative Examples 1 to 5 by using an experimental full-color ink jet printer (600 spi) manufactured by Fuji Xerox. FX-L paper (made by Fuji Xerox) is used as typical plain paper.

The result is evaluated by measuring the optical density of the solid image.

The number of particles (larger than 0.5 $\mu$m) in each ink sample is counted and the particle size distribution is measured in the following manner. A freshly prepared ink as well as an ink collectes immediately after jetting by the printer are used as samples for measurement. The number of particles larger than 0.5 $\mu$m is counted by using Accusizer (made by Particle Sizing Systems) after diluting the specimen (2 $\mu$l) with 50 ml of deionized water. The counted number is expressed in terms of the number of particles per $\mu$l. The particle size distribution is measured by using Microtrack UPA (made by Leeds & Northrup).

Measurement is carried out on the ink specimen as received by regarding the ink viscosity as the solvent viscosity. The results are shown in Table 2.

TABLE 2

| | Dispersion | Optical density | Initial | | | After jetting | | |
|---|---|---|---|---|---|---|---|---|
| | | | No. of particles larger than 0.5 $\mu$m (× 10$^4$) | No. of particles larger than 5 $\mu$m | Number-average particle size (nm) | No. of particles larger than 0.5 $\mu$m (× 10$^4$) (Ratio)** | No. of particles larger than 5 $\mu$m | Number-average particle size (nm) (Ratio of change) *** |
| Example 1 | 1 | 1.42 | 1.2 | 0 | 48.2 | 14.8 (12.3) | 3 | 58.1 (20.5) |
| Example 2 | 2 | 1.40 | 2.4 | 0 | 68.9 | 16.9 (7.0) | 2 | 73.9 (7.3) |
| Example 3 | 3 | 1.46 | 4.5 | 1 | 108.3 | 22.4 (5.0) | 5 | 114.1 (5.4) |
| Example 4 | 4 | 1.48 | 1.5 | 0 | 35.6 | 36.8 (24.5) | 12 | 48.1 (35.1) |
| Comparative Example 1 | 5 | 1.16 | 1.3 | 0 | 55.4 | 3.6 (2.8) | 0 | 57.2 (3.2) |
| Comparative Example 2 | 6 | 1.25 | 1.5 | 0 | 38.7 | 5.8 (3.9) | 1 | 40.6 (4.9) |
| Comparative Example 3 | 7 | * | 1.3 | 0 | 36.8 | 65.4 (50.3) | 25 | 57.6 (56.5) |
| Comparative Example 4 | 8 | 0.98 | 2.3 | 0 | 66.6 | 5.4 (2.3) | 2 | 69.1 (3.8) |
| Comparative Example 5 | 9 | * | 1.3 | 0 | 49.1 | 85.4 (65.7) | 55 | 87.3 (77.8) |

*Unmeasurable due to partial nozzle clogging.
**Ratio compare to initial value.
***Ratio of change in percent.

It is noted from Table 2 that the ink samples in Example 1 to 4 give a higher optical density than the ink samples in Comparative Examples 1 to 5.

Examples 5 to 12

Each dispersion (50 pbw) is gradually added with stirring to the mixture of the solvent components (shown in Table 3) which have been stirred with 30 pbw of deionized water for 30 minutes. The resulting mixture is diluted with deionized water to make the total amount 100 pbw. The mixture is mixed further for 30 minutes. Thus there are obtained ink samples.

Test Example 2

A freshly prepared ink, an ink collects immediately after jetting by the printer, and an ink stored at 60° C. for 100 hours are used as samples. The storage stability of the ink is evaluated by counting the number of particles (larger than 0.5 μm) in each ink sample and measuring the particle size distribution. The results are shown in Table 3.

0.5 mm) for 1 hour. The resulting product undergoes centrifugation (by an ultra centrifuge at 8000 rpm for 15 minutes) and filtration (through a 1 μm membrane filter). Thus there are obtained dispersions 10 and 11.

[Preparation of the first ink]

Ethylene glycol 12 pbw

Ethanol 4 pbw

Urea 5 pbw

Lauryl sulfate ester sodium salt 0.05 pbw The above-mentioned components are diluted with deionized

TABLE 3

| | | Dispersion 2 | | | Dispersion 3 | | |
|---|---|---|---|---|---|---|---|
| | | Initial | After Jetting | After Storage (60° C. 100 hours) | Initial | After Jetting | After Storage (60° C. 100 hours) |
| Example 5, 6 | Diethylene glycol 15 (Solubility parameter 15.0) Isopropyl alcohol 3 (Solubility parameter 11.6) Urea 5 Surfinol 465 (from Nisshin Kagaku) 0.05 | $2.2 \times 10^4$ 0 68.4 nm | $16.2 \times 10^4$ (7.4) 4 74.3 nm (8.6%) | $4.6 \times 10^4$ 0 72.4 nm | $4.3 \times 10^4$ 1 107.5 nm | $20.6 \times 10^4$ (4.8) 8 114.9 nm (6.9%) | $5.1 \times 10^4$ 2 109.2 nm |
| Example 7, 8 | Diethylene glycol 10 (Solubility parameter 15.0) Tiodiethanol 5 (Solubility parameter 15.2) Isopropyl alcohol 3 (Solubility parameter 11.6) Pluronic PE6400 (from BASF) 0.03 | $2.1 \times 10^4$ 0 68.2 nm | $17.2 \times 10^4$ (8.2) 3 73.9 nm (8.4%) | $5.2 \times 10^4$ 0 69.8 nm | $4.2 \times 10^4$ 1 108.1 nm | $22.6 \times 10^4$ (4.3) 5 113.9 nm (5.4%) | $5.6 \times 10^4$ 2 110.1 nm |
| Example 9, 10 | Glycerol 12 (Solubility parameter 20.2) Ethanol 4 (Solubility parameter 12.6) Urea 5 Lauryl sulfate ester sodium salt 0.05 | $2.2 \times 10^4$ 0 67.3 nm | $16.3 \times 10^4$ (7.4) 2 72.1 nm (7.1%) | $4.3 \times 10^4$ 0 70.6 nm | $4.0 \times 10^4$ 2 107.1 nm | $23.4 \times 10^4$ (5.4) 7 115.2 nm (7.6%) | $5.2 \times 10^4$ 2 110.0 nm |
| Example 11, 12 | Ethylene glycol 15 (Solubility parameter 17.8) Ethanol 3 (Solubility parameter 12.6) Poly oxyethylene alkyl ether 0.05 | $2.0 \times 10^4$ 0 65.9 nm | $15.6 \times 10^4$ (7.8) 3 72.9 nm (10.6%) | $4.3 \times 10^4$ 0 71.1 nm | $4.4 \times 10^4$ 2 106.8 nm | $22.2 \times 10^4$ (5.0) 7 113.7 nm (6.5%) | $4.9 \times 10^4$ 2 108.2 nm |

Upper: Number of particles larger than 0.5 μm./Parenthesis shows ratio to initial value.
Middle: Number of particles larger than 5 μm.
Lower: Number-average particle size./Parenthesis shows ratio of change in percent.

The ink-liquid combination according to the present invention is explained with reference to the following Examples, Comparative Examples, and Test Examples.

[Preparation of dispersions]

water to make the total amount 50 pbw. The resulting mixture is stirred for 30 minutes. With the dispersion 10 or 11 added, stirring is continued for 30 minutes. The resulting product is

TABLE 4

| Dispersion | Pigment | Polymeric dispersant (aqueous polymer) | Calculated HLB |
|---|---|---|---|
| 10 | Carbon black BP880 (Cabot) | Styrene/sodium methacrylate copolymer (monomer ratio = 50:50, M.W. = 10000) | 14.1 |
| 11 | Carbon black BP880 (Cabot) | Styrene/sodium methacrylate copolymer (monomer ratio = 33:67, M.W. = 7300) | 17.8 |

60 pbw of the polymeric dispersant (aqueous solution containing 10% polymer solids) as specified in Table 4 is mixed with 210 pbw of deionized water. The resulting mixture is further mixed with 30 pbw of the pigment shown in Table 4. After stirring for 30 minutes, the mixture is processed for dispersion by a Dainoh mill (medium: zirconia filtered through a 2-μm membrane filter. Thus there are obtained ink samples. The first ink prepared from the dispersion 10 is designated as ink 1. Ink 1 has a surface tension of 50.4 mN/m. The first ink prepared from the dispersion 11 is designated as ink 2. Ink 2 has a surface tension of 44.5 mN/m.

Test Example 3

Each of freshly prepared ink 1 and ink 2 as well as each of ink 1 and ink 2 collected immediately after jetting by the printer are used as samples for measurement. The number of particles larger than 0.5 μm is counted and the particle size distribution is measured in the same way as in Test Example 1.

The ratio of change in the number of particles are calculated. The results are shown in Table 5.

TABLE 5

| | Number of particles | | | Particle size | | |
|---|---|---|---|---|---|---|
| | Initial | After jetting | Ratio | Initial | After jetting | Ratio in change |
| Ink 1 | $1.3 \times 10^4$ | $22.1 \times 10^4$ | 17.0 | 47.6 nm | 53.1 nm | 11.6% |
| Ink 2 | $1.5 \times 10^4$ | $2.1 \times 10^4$ | 1.4 | 49.5 nm | 50.2 nm | 1.4% |

Preparation of the Second Liquid, Containing a Colorant

[Second liquid 1]

Direct yellow 144 (10% aqueous solution) 20 pbw
Ethylene glycol (solubility parameter 17.8) 25 pbw
Urea 5 pbw The above-mentioned components are diluted with deionized water to make the total amount 100 pbw. After stirring for 30 minutes, the solution is filtered through a 1-μm membrane filter. Thus there is obtained the second liquid 1. This liquid has a surface tension of 55.4 mN/m.

[Second liquid 2]

Direct yellow 144 (10% aqueous solution) 20 pbw
Ethylene glycol (solubility parameter 17.8) 25 pbw
Urea 5 pbw
Surfinol 465 1 pbw The second liquid 2 is prepared from the above-mentioned components in the same way as for the second liquid 1. This liquid has a surface tension of 35.6 mN/m.

[Second liquid 3]

| Direct yellow 144 (10% aqueous solution) | 20 pbw |
|---|---|
| Ethylene glycol (solubility parameter 17.8) | 20 pbw |
| 2-(2-ethoxyethoxy)ethanol (solubility parameter 10.9) | 5 pbw |
| Urea | 5 pbw |

The second liquid 3 is prepared from the above-mentioned components in the same way as for the second liquid 1. This liquid has a surface tension of 38.0 mN/m.

[Second liquid 4]

| Direct yellow 144 (10% aqueous solution) | 20 pbw |
|---|---|
| Ethylene glycol (solubility parameter 17.8) | 20 pbw |
| 2-(2-ethoxyethoxy) ethanol (solubility parameter 10.9) | 5 pbw |
| Urea | 5 pbw |
| Benzalkonium chloride | 1 pbw |

The second liquid 4 is prepared from the above-mentioned components in the same way as for the second liquid 1. This liquid has a surface tension of 37.2 mN/m.

[Second liquid 5]

| Direct yellow 144 (10% aqueous solution) | 20 pbw |
|---|---|
| Ethylene glycol (solubility parameter 17.8) | 20 pbw |
| 2-(2-ethoxyethoxy) ethanol (solubility parameter 10.9) | 5 pbw |
| Urea | 5 pbw |
| Benzalkonium chloride | 5 pbw |

The above-mentioned components are diluted with deionized water to make the total amount 100 pbw. After stirring for 30 minutes, an attempt is made to filter the solution through a 1-μm membrane filter. Filtration is impossible due to clogging. Particulate matter is found on the filter.

[Second liquid 6]

| Direct yellow 144 (10% aqueous solution) | 20 pbw |
|---|---|
| Ethylene glycol (solubility parameter 17.8) | 20 pbw |
| 2-(2-ethoxyethoxy) ethanol (solubility parameter 10.9) | 5 pbw |
| Urea | 5 pbw |
| Magnesium sulfate | 0.8 pbw |

The second liquid 6 is prepared from the above-mentioned components in the same way as for the second liquid 1. This liquid has a surface tension of 38.3 mN/m.

[Second liquid 7]

| Direct yellow 144 (10% aqueous solution) | 20 pbw |
|---|---|
| Ethylene glycol (solubility parameter 17.8) | 20 pbw |
| 2-(2-ethoxyethoxy) ethanol (solubility parameter 10.9) | 5 pbw |
| Urea | 5 pbw |
| Magnesium nitrate | 8 pbw |

The above-mentioned components are diluted with deionized water to make the total amount 100 pbw. After stirring for 30 minutes, an attempt is made to filter the solution through a 1-μm membrane filter. Filtration is impossible due to clogging. Particulate matter is found on the filter.

Examples 13 to 17 and Comparative Examples 6 to 9 and Test Example 4

Printing Test

Printing (adjoining 2-cm square patches) is made with each of the first ink and the second liquid shown in Table 6 by using an experimental full-color ink jet printer (600 spi) manufactured by Fuji Xerox. FX-L paper (made by Fuji Xerox) is used as typical plain paper. The color mixing (intercolor bleed) at their boarder on the printed image is evaluated based on the standard image reference by ten panelists. The criteria for the standard image reference are as follows.

⊚: No color mixing at all
○: Slight color mixing, not visible
Δ: Color mixing, slightly visible but allowable
X: Color mixing, visible and not allowable
XX: Remarkable color mixing
The results are shown in Table 6.

TABLE 6

|  | The first ink | The second liquid | Color mixing |
| --- | --- | --- | --- |
| Example 13 | Ink 1 | Liquid 1 | Δ |
| Example 14 | Ink 1 | Liquid 2 | ○ |
| Example 15 | Ink 1 | Liquid 3 | ○ |
| Example 16 | Ink 1 | Liquid 4 | ⊚ |
| Example 17 | Ink 1 | Liquid 6 | ⊚ |
| Comparative Example 6 | Ink 2 | Liquid 2 | x x |
| Comparative Example 7 | Ink 2 | Liquid 3 | x x |
| Comparative Example 8 | Ink 2 | Liquid 4 | x |
| Comparative Example 9 | Ink 2 | Liquid 6 | x |

It is noted from Table 6 that printing with the ink-liquid combination (in Examples 12 to 17) pertaining to the present invention caused no color mixing unlike printing in Comparative Examples 6 to 9.

Preparation of the Second Liquid, Containing No Colorant

[Second liquid 8]

| Ethylene glycol (solubility parameter (17.8) | 25 pbw |
| --- | --- |
| Urea | 5 pbw |
| Surfinol 465 | 1 pbw |
| Benzalkonium chloride | 5 pbw |

The above-mentioned components are diluted with deionized water to make the total amount 100 pbw. After stirring for 30 minutes, the solution is filtered through a 1-μm membrane filter. Thus there is obtained the second liquid 8. This liquid has a surface tension of 33.8 mN/m.

Examples 18 to 20 and Comparative Examples 10 to 12 and Test Example 5

Printing Test

At first, the printing (10 cm square patch) is made with the second liquid 8 by using an experimental full-color ink jet printer (600 spi) manufactured by Fuji Xerox. Immediately after this printing, the first ink(shown in Table 7) jets out on this area (printed liquid 8) in order to form the 10 cm square image and the liquid 1 (as the base ink) jets out adjacent to the patch printed by first ink. The printing with the second liquid 1 is carried out such that the number of dots is 1/10, 3/10, or 5/10 of the number of dots per unit area for the first ink. FX-L paper (made by Fuji Xerox) is used as typical plain paper. The color mixing (intercolor bleed) at their boarder on the printed image is evaluated based on the standard image reference by ten panelists. The criteria for the standard image reference are as follows.

⊚: No color mixing at all
○: Slight color mixing, not visible
Δ: Color mixing, slightly visible but allowable
X: Color mixing, visible and not allowable
XX: Remarkable color mixing And, also wrinkle height was evaluated based on criteria. The criteria are as follows.

○: Wrinkle height less than 4 mm
X: Wrinkle height from 4 to 8 mm
XX: Wrinkle height more than 8 mm The results are shown in Table 7.

TABLE 7

|  | First ink | Ratio of second liquid to first ink | Color mixing | Wrinkle height |
| --- | --- | --- | --- | --- |
| Example 18 | Ink 1 | 1/10 | ⊚ | ○ |
| Example 19 | Ink 1 | 3/10 | ⊚ | Δ |
| Example 20 | Ink 1 | 5/10 | ⊚ | Δ |
| Comparative Example 10 | Ink 2 | 1/10 | x | ○ |
| Comparative Example 11 | Ink 2 | 3/10 | ○ | x |
| Comparative Example 12 | Ink 2 | 5/10 | ⊚ | x x |

It is noted from Table 7 that printing with the ink-liquid combination in Examples 18 to 20 pertaining to the present invention caused no color mixing and prevented curling, unlike Comparative Examples 10 to 12.

As mentioned above, the ink for ink jet printing of the present invention possesses the characteristics of both high optical density and good storage stability although it is of pigment dispersion type. The ink for ink jet printing of the present invention prevents adjacent colorant from mixing together when it is used in combination with the second liquid.

The ink or the ink-liquid combination of the present invention forms clear, high-resolution, water-fastness, full-color images on plain paper (such as report paper, coping paper, bond paper, and wood-free paper), without deteriorating paper quality (due to wrinkling). The ink for ink jet printing of the present invention is suitable for ink jet printing of thermal ink jet type, piezoelectric type, ultrasonic type, or electric field type. It invariably forms clear, water-fastness, full-color images on plain paper.

What is claimed is:

1. An ink for ink jet printing, comprising:
   a pigment;
   a water-soluble organic solvent;
   water; and
   an aqueous polymer having an HLB ranging from about 11 to about 15,
wherein
   the number-average particle diameter is from 10 to 150 um before ink jetting; and
   the number of particles having a particle diameter larger than 0.5 μm is less than $6 \times 10^4$ before ink jetting; and
wherein
   the number-average particle diameter is from 10 to 150 nm after ink jetting;
   the number of particles having a particle diameter larger than 0.5 μm is from $6 \times 10^4$ to $6 \times 10^5 / \mu l$ after ink jetting; and the number of particles having a particle diameter larger than 5 µm is less than 50/µl after ink jetting.

2. The ink for ink jet printing according to claim 1, wherein the rate of change of the number-average particle diameter is from 0 to 50% by ink jetting.

3. The ink for ink jet printing according to claim 2, wherein the number of particles, having a particle diameter larger than 0.5 µm, increases threefold or more after ink jetting.

4. The ink for ink jet printing according to claim 1, wherein the aqueous polymer is a dispersant and the water-soluble organic solvent has a solubility parameter equal to or larger than 11.

5. The ink for ink jet printing according to claim 4, wherein the water-soluble organic solvent having a solubility parameter equal to or larger than 11 and smaller than 15 is less than 5 wt % of the total amount (by weight) of the ink, and the water-soluble organic solvent having a solubility parameter of 15 and above is 1 to 50 wt % of the total amount (by weight) of the ink.

6. The ink for ink jet printing according to claim 4, wherein the dispersant has a weight-average molecular weight of 300p to 20000.

7. The ink for ink jet printing according to claim 1, wherein the pigment is carbon black having a primary aggregate particle diameter of 10 to 30 nm.

8. A method for ink jet printing comprising the step of jetting an ink for ink jet printing according to claim 1, onto a surface to be printed.

9. The method of ink jet printing according to claim 8, which employs a thermal ink jet system.

10. A recording material comprising:
an ink according to claim 1; and
a second liquid containing a water-soluble organic solvent with a solubility parameter of 9 to 11 and/or a surfactant and water.

11. The recording material according to claim 10, wherein the ink has a surface tension of 35 to 55 mN/m and the second liquid has a surface tension of 20 to 40 mN/m.

12. The recording material according to claim 10, wherein the second liquid contains a multivalent metal salt and/or a cationic compound.

13. The recording material according to claim 10, wherein the second liquid contains a colorant.

14. A method of ink jet printing, comprising the step of jetting a recording material according to claim 10, onto a surface to be printed.

15. The method of ink jet printing according to claim 14, wherein the ink and the second liquid are jetted adjacently for performing printing with the ink and the second liquid adjacently.

16. The method of ink jet printing according to claim 14, wherein the recording material is jetted with the ratio of the second liquid to the ink being 2:10 to 0.1:10.

17. The method of ink jet printing according to claim 14, which employs a thermal ink jet system.

\* \* \* \* \*